(12) United States Patent
Suda et al.

(10) Patent No.: US 10,189,501 B2
(45) Date of Patent: Jan. 29, 2019

(54) PARKING ASSIST APPARATUS AND PARKING ASSIST METHOD

(71) Applicant: ALPINE ELECTRONIC, INC., Tokyo (JP)

(72) Inventors: Ryohei Suda, Fukushima (JP); Kosuke Munakata, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 137 days.

(21) Appl. No.: 15/381,350

(22) Filed: Dec. 16, 2016

(65) Prior Publication Data

US 2017/0203789 A1  Jul. 20, 2017

(30) Foreign Application Priority Data

Jan. 14, 2016 (JP) .................................. 2016-005376

(51) Int. Cl.
*H04N 5/445* (2011.01)
*B62D 15/02* (2006.01)
(Continued)

(52) U.S. Cl.
CPC .......... *B62D 15/0275* (2013.01); *B60R 1/002* (2013.01); *G06K 9/00798* (2013.01);
(Continued)

(58) Field of Classification Search
CPC .. B62D 15/0275; G08G 1/0962; G08G 1/168; G06T 3/00; H04N 7/183;
(Continued)

(56) References Cited

U.S. PATENT DOCUMENTS 6,940,423 B2 * 9/2005 Takagi ...................... B60R 1/00
340/425.5
8,195,360 B2 * 6/2012 Nakadori ............ B60W 40/072
701/36
(Continued)

FOREIGN PATENT DOCUMENTS

JP 2006-160194 A 6/2006
JP 2010-184607 A 8/2010
(Continued)

OTHER PUBLICATIONS

Llorca et al, Vision-based parking assistance system for leaving perpendicular and angle parking lots (Year: 2013).*
(Continued)

*Primary Examiner* — Shan E Elahi
(74) *Attorney, Agent, or Firm* — Brinks Gilson & Lione

(57) ABSTRACT

A parking assist apparatus includes a parking range identification unit that identifies a current parking range using vehicle speed information and steering angle information acquired from a vehicle along with movement of the vehicle, a display control unit that causes an image indicating the identified current parking range to be displayed in such a manner as to be superimposed on a vehicle-surroundings image, an estimated movement range calculation unit that, when no vehicle speed information can be acquired in a process of a gradual reduction in vehicle speed, calculates an estimated movement range of the vehicle using deceleration of the vehicle based on vehicle speed information acquired before a time when no vehicle speed information can be acquired, and the steering angle information, and an estimated movement range display unit that displays, around the image indicating the current parking range, an image indicating the calculated estimated movement range.

3 Claims, 8 Drawing Sheets

(51) Int. Cl.
  B60R 1/00 (2006.01)
  G06T 3/00 (2006.01)
  G06K 9/00 (2006.01)
  G08G 1/0962 (2006.01)
  G08G 1/16 (2006.01)
  H04N 7/18 (2006.01)

(52) U.S. Cl.
  CPC ............. *G06T 3/00* (2013.01); *G08G 1/0962* (2013.01); *G08G 1/168* (2013.01); *H04N 5/44504* (2013.01); *H04N 7/183* (2013.01); *B60R 2300/304* (2013.01); *B60R 2300/305* (2013.01); *B60R 2300/607* (2013.01); *B60R 2300/806* (2013.01)

(58) Field of Classification Search
  CPC ............ H04N 5/44504; G06K 9/00798; B60R 1/002; B60R 2300/607; B60R 2300/806; B60R 2300/304; B60R 2300/305
  USPC .......................................................... 348/118
  See application file for complete search history.

(56) References Cited

U.S. PATENT DOCUMENTS

| | | | | |
|---|---|---|---|---|
| 8,319,663 B2* | 11/2012 | Von Reyher | ......... | B62D 15/028 180/167 |
| 8,441,536 B2 | 5/2013 | Imanishi et al. | | |
| 8,514,282 B2 | 8/2013 | Imanishi et al. | | |
| 8,855,850 B2* | 10/2014 | Suzuki | ................. | B62D 15/028 340/932.2 |
| 9,002,564 B2* | 4/2015 | Shaffer | ................ | G05D 1/0088 180/272 |
| 2006/0271278 A1* | 11/2006 | Sakakibara | ........ | B62D 15/0275 701/523 |
| 2010/0089677 A1* | 4/2010 | Tanaka | ................. | B62D 15/027 180/204 |
| 2010/0228426 A1* | 9/2010 | Suzuki | ............... | B62D 15/0275 701/31.4 |
| 2013/0002877 A1* | 1/2013 | Miyoshi | .................... | B60R 1/00 348/148 |
| 2013/0038715 A1* | 2/2013 | Ichikawa | ............... | B60K 6/445 348/118 |
| 2013/0076876 A1* | 3/2013 | Shimotani | ............ | G01C 21/365 348/51 |
| 2013/0120161 A1* | 5/2013 | Wakabayashi | ..... | B62D 15/0295 340/932.2 |
| 2014/0152774 A1* | 6/2014 | Wakabayashi | ......... | G08G 1/168 348/46 |
| 2015/0092056 A1* | 4/2015 | Rau | ........................ | G08G 1/167 348/148 |
| 2015/0258988 A1* | 9/2015 | Morimoto | ............ | B62D 15/027 701/70 |
| 2016/0001774 A1* | 1/2016 | Nakada | ................. | B60W 10/04 701/22 |
| 2018/0170366 A1* | 6/2018 | Fukushima | ........... | B60W 30/06 |

FOREIGN PATENT DOCUMENTS

| | | |
|---|---|---|
| JP | 2010-232723 A | 10/2010 |
| JP | 2013-055410 A | 3/2013 |

OTHER PUBLICATIONS

Suzuki et al, Parking assistance using multi-camera infrastructure (Year: 2005).*

Zhang et al, A surround view camera solution for embedded systems (Year: 2014).*

* cited by examiner

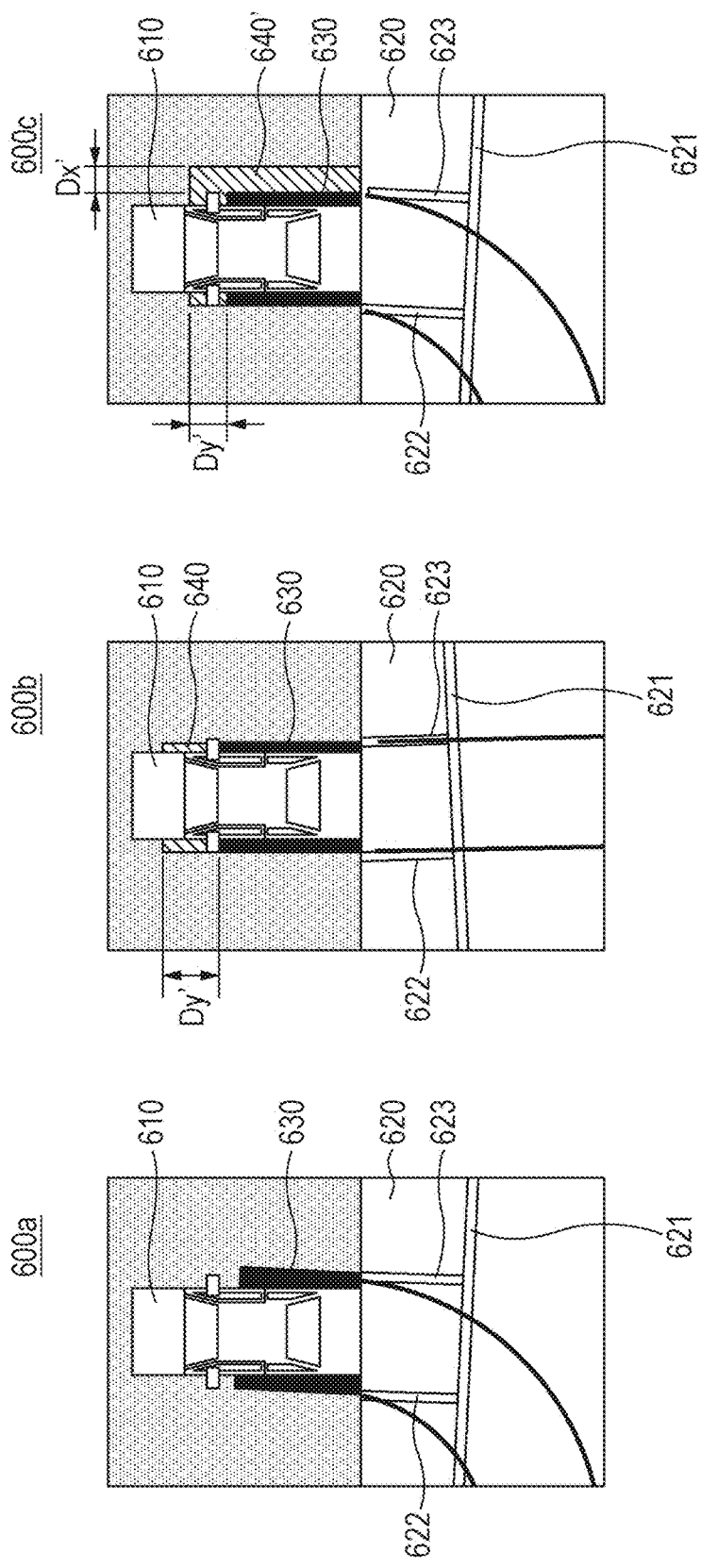

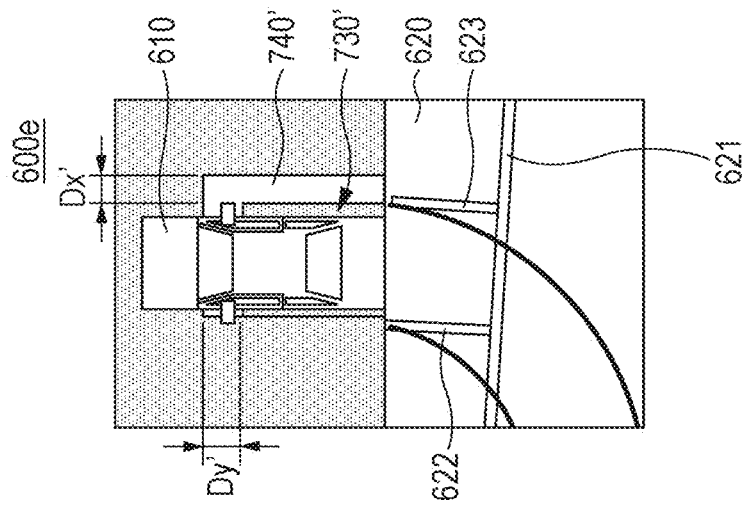
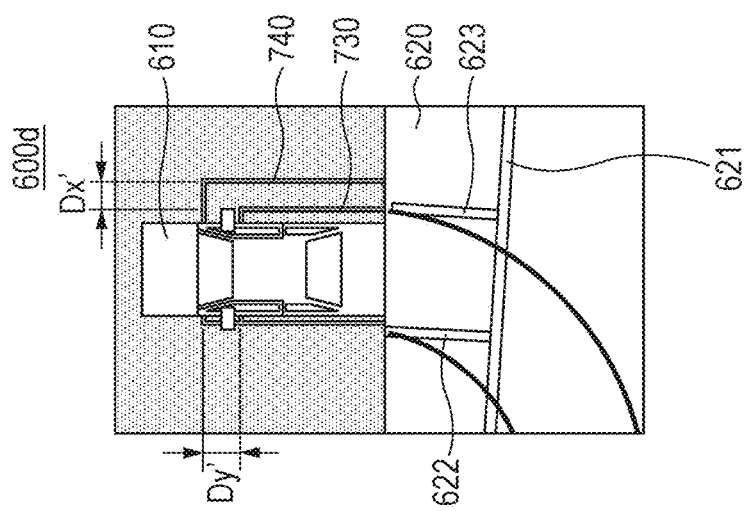

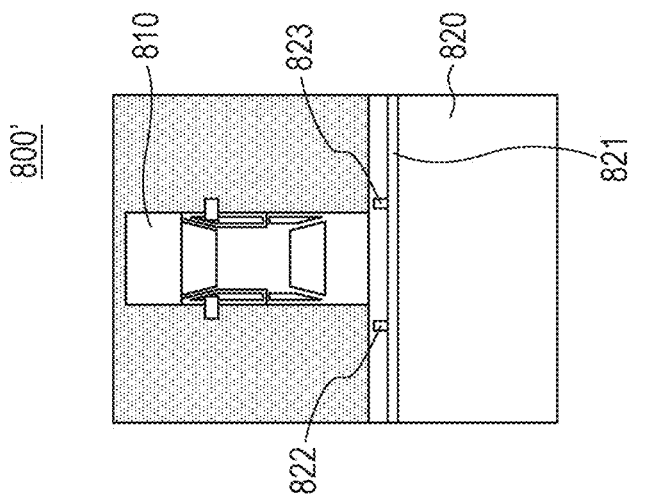
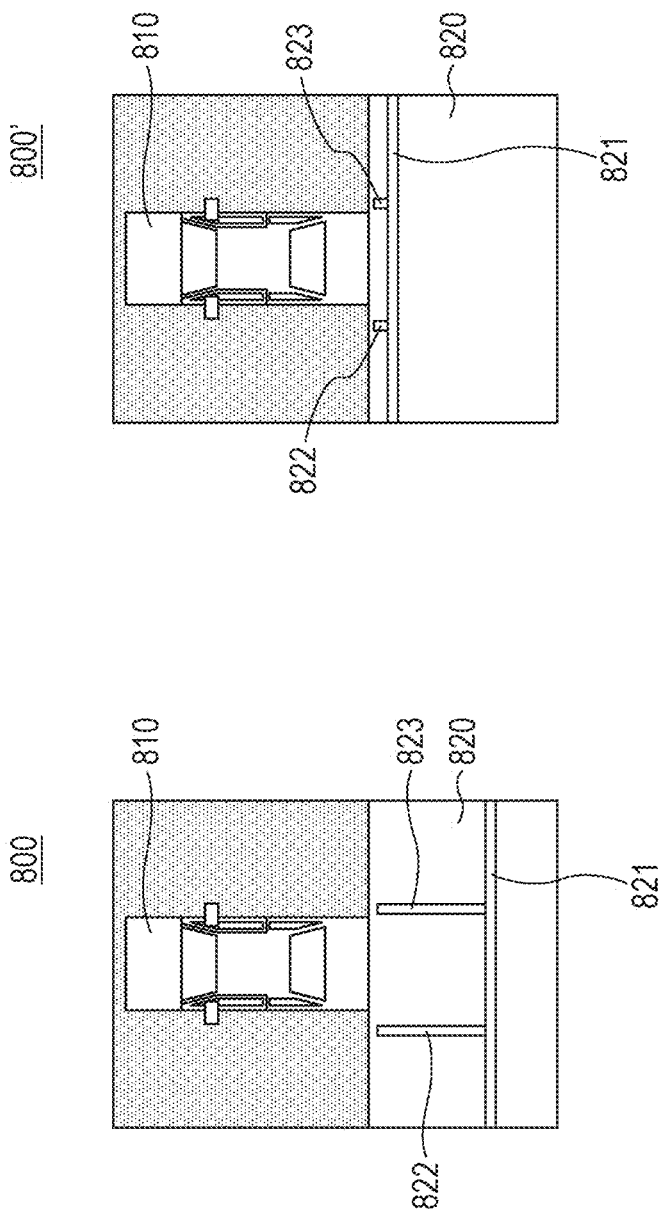

PARKING ASSIST APPARATUS AND PARKING ASSIST METHOD

RELATED APPLICATION

The present application claims priority to Japanese Patent Application Number 2016-005376, filed Jan. 14, 2016, the entirety of which is hereby incorporated by reference.

BACKGROUND

1. Field

The present disclosure relates to a parking assist apparatus and a parking assist method and is particularly suitable for use in a parking assist apparatus and a parking assist method in which an image indicating a parking range of a vehicle is displayed in such a manner as to be superimposed on a viewpoint-converted image on the basis of vehicle speed information and steering angle information acquired from the vehicle along with movement of the vehicle.

2. Description of the Related Art

In related art, when a vehicle is reversed into a parking space, a technique has been used where a display in the vehicle displays a vehicle rearward image, which is an image of an area rearward of the vehicle, captured by a rear camera, or a viewpoint-converted image generated from the vehicle rearward image. The viewpoint-converted image is an image of the area rearward of the vehicle as viewed from a virtual viewpoint above the vehicle by subjecting the vehicle rearward image to viewpoint conversion. A driver drives while viewing a positional relationship between a parking frame and the vehicle within the image displayed on the display, thereby enabling the vehicle to be parked in a predetermined parking frame.

However, as the vehicle moves rearward, the range of the parking frame appearing in the vehicle rearward image is gradually narrowed, and finally almost no parking frame appears in the vehicle rearward image. In this case, it is difficult for the driver to check, from the image, whether the vehicle has been properly parked within the parking frame.

FIGS. 8A and 8B each illustrate an example of an existing vehicle-surroundings image. A vehicle-surroundings image 800 illustrated in FIG. 8A is generated from a viewpoint-converted image 820 obtained by subjecting a vehicle rearward image to viewpoint conversion, and an image 810 of a driver's vehicle. In the viewpoint-converted image 820, there appears a parking frame composed of a white line 821 rearward of the vehicle, a white line 822 on the left side of the vehicle, and a white line 823 on the right side of the vehicle. As illustrated in FIG. 8A, when the vehicle is away from the white line 821 rearward of itself, the white lines 822 and 823 on the left and right sides of the vehicle appear in the viewpoint-converted image 820 with their lengths being relatively long. In this case, a driver checks a positional relationship between the image 810 of the driver's vehicle and the white lines 822 and 823 appearing in the viewpoint-converted image 820 via the vehicle-surroundings image 800 and thus can check whether the vehicle has been properly parked within the parking frame.

On the other hand, when the vehicle moves closer to the white line 821, a vehicle-surroundings image 800' illustrated in FIG. 8B is generated from the viewpoint-converted image 820 obtained by subjecting the vehicle rearward image to viewpoint conversion, and the image 810 of the driver's vehicle. As illustrated in FIG. 8B, when the vehicle moves closer to the white line 821 rearward of itself, almost no white lines 822 and 823 on the left and right sides of the vehicle appear in the viewpoint-converted image 820. In this case, it is difficult for the driver to check, from the vehicle-surroundings image 800', whether the vehicle has been properly parked within the parking frame.

Thus, in an existing technique in which a viewpoint-converted image is generated from a vehicle rearward image captured by a camera and is displayed, a technique is developed in which a position of a current parking frame is calculated on the basis of a position of a past parking frame detected from a past vehicle rearward image and information on movement of a vehicle, and in which an image of a pseudo-parking frame indicating the calculated position of the current parking frame is combined with a current viewpoint-converted image and is displayed.

For example, Japanese Unexamined Patent Application Publications Nos. 2010-232723 and 2010-184607 each disclose a technique in which a raw image of an area rearward of a vehicle captured by a camera is displayed in a rearward image display region of a display and also in which a computer-graphic vehicle and a white line (pseudo-parking frame image) detected from a past image stored in a memory are drawn at respective corresponding positions in a history display region of the display. In the technique disclosed in Japanese Unexamined Patent Application Publications Nos. 2010-232723 and 2010-184607, in particular, an accurate position of the white line (pseudo-parking frame image) with respect to the vehicle (computer-graphic vehicle) is maintained using signals regarding vehicle movement (a movement distance and a rotation direction) in accordance with movement of the vehicle.

Japanese Unexamined Patent Application Publication No. 2006-160194 discloses a technique in which, even in the case where there is actually no parking guide, such as a white line, when it is determined, from an image obtained by subjecting an image captured by a camera to viewpoint conversion, that there is a parking space in a position adjacent to another vehicle, a pseudo-parking white line image indicating the same number of spaces as the number of vehicles that can be parked in the parking space is drawn on a parking space in the viewpoint-converted image. Furthermore, Japanese Unexamined Patent Application Publication No. 2006-160194 discloses a technique in which a parking white line image is redrawn in accordance with movement (turning action) of a driver's vehicle.

Japanese Unexamined Patent Application Publications Nos. 2010-232723 and 2010-184607 each describe that a movement distance of the vehicle is determined from the number of revolutions of a wheel. A movement distance of a vehicle can be typically determined from vehicle speed information of the vehicle. However, in a typical vehicle, no vehicle speed information can be acquired if the vehicle speed is less than 1 km/h. For this reason, in a method in which a movement distance of a vehicle is calculated on the basis of vehicle speed information, if the vehicle moves at a speed of less than 1 km/h, the vehicle is regarded as being stopped, and thus a movement distance of the vehicle cannot be calculated accurately. As a result, a position in which a pseudo-parking frame is displayed with respect to the vehicle cannot be displayed accurately.

Japanese Unexamined Patent Application Publication No. 2013-55410 discloses a vehicle-surroundings image display control apparatus that causes a display to display, as a vehicle-surroundings image, an image obtained by combining a real image based on a latest captured image with a history image generated using a past captured image on the basis of vehicle movement amount information, and discloses a technique in which, during a time that elapses before subsequent vehicle movement amount information is acquired, an expected movement amount of a vehicle is estimated on the basis of previously acquired vehicle movement amount information. It can be considered that, even if no vehicle speed information can be acquired when the vehicle speed is less than 1 km/h, use of this technique enables an expected movement amount of a vehicle to be estimated on the basis of previously acquired vehicle movement amount information and enables a pseudo-parking frame to be displayed in a position corresponding to the expected movement amount.

However, even when an expected movement amount is calculated in this way and a pseudo-parking frame is displayed in an expected position, there is some question as to how a vehicle moves in actuality, and thus an error in the position in which the pseudo-parking frame is displayed occurs in some cases. In the related art, however, because a pseudo-parking frame is displayed as if it is displayed accurately, when a user believes a display of the pseudo-parking frame to be accurate and moves his or her vehicle, the vehicle cannot be parked in an intended position. In the technique disclosed in Japanese Unexamined Patent Application Publication No. 2006-160194, a parking white line that does not actually exist is drawn, and no movement distance of a vehicle is used. For this reason, even when the technique disclosed in Japanese Unexamined Patent Application Publication No. 2006-160194 is used, such an issue cannot be solved.

To solve such issues, one or more aspects of the present disclosure enable, if there is a possibility of occurrence of an error in the position of a pseudo-parking frame, a user to move a vehicle on the basis of the possibility of the error.

SUMMARY

To solve the above-mentioned issues, in an aspect of the present disclosure, a current parking range is identified by using vehicle speed information and steering angle information acquired from a vehicle along with movement of the vehicle, and an image indicating the identified current parking range is displayed in such a manner as to be superimposed on a vehicle-surroundings image of surroundings of the vehicle as viewed from an upper virtual viewpoint. Then, when no vehicle speed information can be acquired in a process of a gradual reduction in vehicle speed, an estimated movement range of the vehicle after a time when no vehicle speed information can be acquired is calculated by using deceleration of the vehicle based on vehicle speed information acquired before the time when no vehicle speed information can be acquired, and the steering angle information, and an image indicating the calculated estimated movement range is displayed around the image indicating the current parking range of the vehicle.

According to the above-described aspect of the present disclosure, if the vehicle speed is reduced to a speed of less than a predetermined speed and thus no vehicle speed information can be acquired, a user can intuitively grasp an estimated movement range of a vehicle by using an image of the estimated movement range displayed around an image indicating a parking range. Thus, the aspect of the present disclosure enables, if there is a possibility of occurrence of an error in the position of a pseudo-parking frame, the user to move the vehicle on the basis of the possibility of the error.

BRIEF DESCRIPTION OF THE DRAWINGS

FIGS. 6A to 6C each illustrate an example of a vehicle-surroundings image and an estimated movement range image according to the embodiment of the present disclosure;

FIGS. 7A and 7B each illustrate a modification of a parking range image and an estimated movement range image according to the embodiment of the present disclosure; and FIGS. 8A and 8B each illustrate an example of an existing vehicle-surroundings image.

DESCRIPTION OF THE PREFERRED EMBODIMENT

Figure 1:
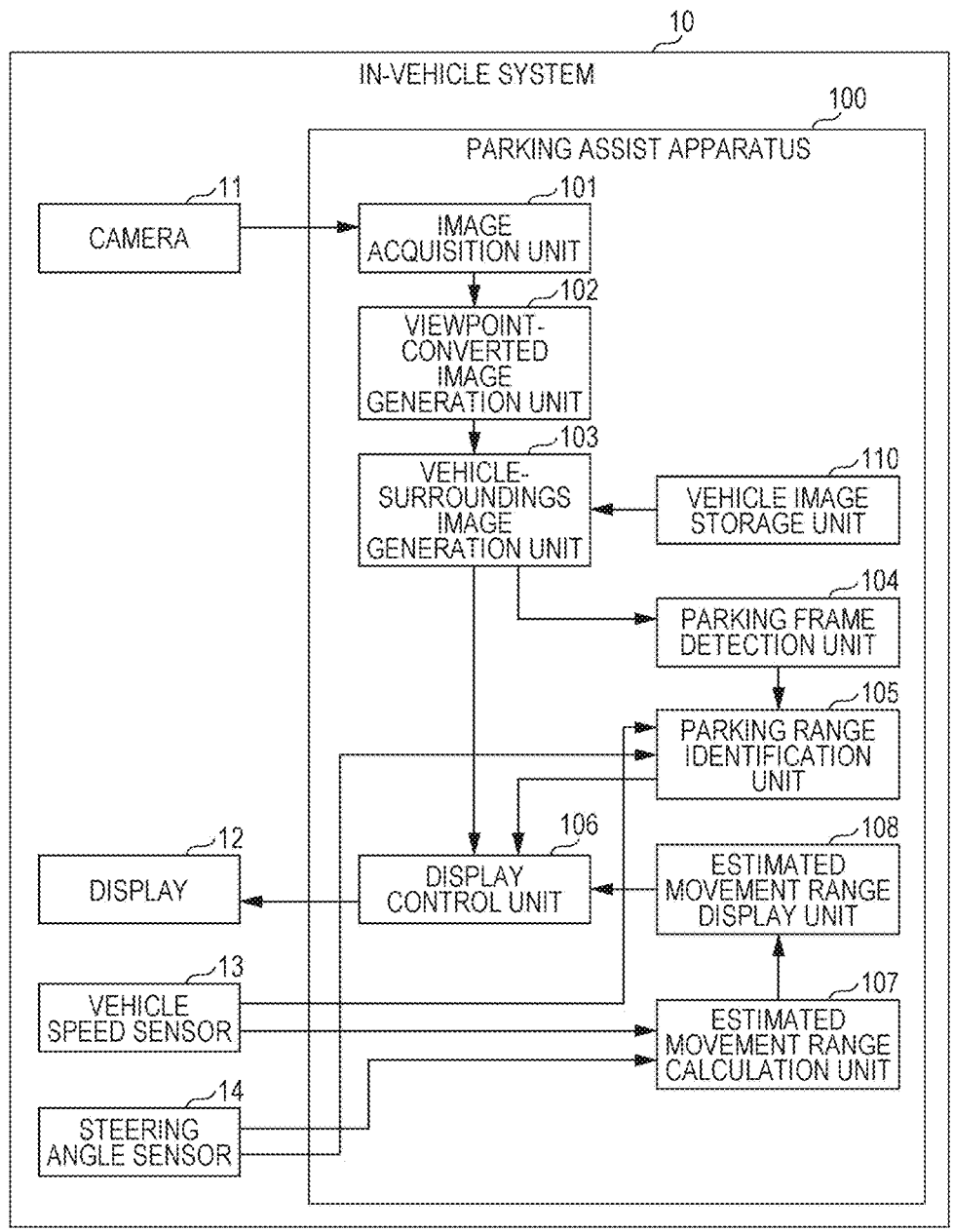
FIG. 1 is a block diagram illustrating an example of a functional configuration of an in-vehicle system including a parking assist apparatus according to an embodiment of the present disclosure.

An embodiment of the present disclosure will be described below with reference to the drawings. FIG. 1 is a block diagram illustrating an example of a functional configuration of an in-vehicle system 10 including a parking assist apparatus 100 according to the embodiment of the present disclosure.

The in-vehicle system 10 according to the embodiment illustrated in FIG. 1 is a system installed in a vehicle, such as an automobile. When the vehicle is reversed into a parking space, the in-vehicle system 10 generates an image of surroundings of the vehicle (hereinafter, referred to as "vehicle-surroundings image") as viewed from an upper virtual viewpoint, from a viewpoint-converted image generated from a vehicle rearward image (an example of "vehicle capture image" described in an aspect of the present disclosure) captured by a camera 11, an image of the vehicle stored in a vehicle image storage unit 110 in advance, and an image indicating a parking range of the vehicle (hereinafter, referred to as "parking range image"). The vehicle rearward image refers to an image of an area rearward of the vehicle. Then, the in-vehicle system 10 displays the vehicle-surroundings image on a display 12 and thus assists parking of the vehicle.

As illustrated in FIG. 1, the in-vehicle system 10 according to the embodiment includes the camera 11, the display 12, a vehicle speed sensor 13, a steering angle sensor 14, and the parking assist apparatus 100. The parking assist apparatus 100 includes, as its functional components, an image acquisition unit 101, a viewpoint-converted image generation unit 102, a vehicle-surroundings image generation unit 103, a parking frame detection unit 104, a parking range identification unit 105, a display control unit 106, an estimated movement range calculation unit 107, and an estimated movement range display unit 108. The parking assist apparatus 100 further includes the vehicle image storage unit 110.

The above-described functional blocks 101 to 108 can be implemented by any of hardware, a digital signal processor (DSP), and software. For example, in the case where the functional blocks 101 to 108 are implemented by software, they are actually provided with a central processing unit (CPU), a random access memory (RAM), a read only memory (ROM), and the like that are included in a computer. The functional blocks 101 to 108 are implemented by causing a program stored in a recording medium, such as the RAM or ROM, a hard disk, or a semiconductor memory, to run.

The camera 11 is mounted on the rear of the vehicle and captures a vehicle rearward image. The display 12 displays various display screens (for example, a vehicle-surroundings image). The vehicle speed sensor 13 outputs vehicle speed information corresponding to the speed of the vehicle. The vehicle speed sensor 13 does not output vehicle speed information if the vehicle speed is less than 1 km/h. The steering angle sensor 14 outputs steering angle information corresponding to the steering angle of a front wheel of the vehicle. The vehicle image storage unit 110 stores an image of the vehicle (see FIGS. 6A to 7B) in advance.

The image acquisition unit 101 acquires a vehicle rearward image captured by the camera 11. The viewpoint-converted image generation unit 102 generates a viewpoint-converted image as viewed from a virtual viewpoint above the vehicle by subjecting the vehicle rearward image acquired by the image acquisition unit 101 to viewpoint conversion.

The vehicle-surroundings image generation unit 103 generates a vehicle-surroundings image from the viewpoint-converted image generated by the viewpoint-converted image generation unit 102 and the image of the vehicle stored in the vehicle image storage unit 110 in advance.

The parking frame detection unit 104 detects a parking frame from the vehicle rearward image acquired by the image acquisition unit 101 or the viewpoint-converted image generated by the viewpoint-converted image generation unit 102. For example, the parking frame detection unit 104 detects, as a parking frame, a white line indicating a rectangle or part of the rectangle appearing in the image. A parking frame can be detected by using a known image identification technique.

The parking range identification unit 105 identifies a current parking range on the basis of the position of the parking frame (the position of the parking frame with respect to the vehicle) detected by the parking frame detection unit 104 from a past vehicle rearward image or a past viewpoint-converted image, and vehicle speed information (vehicle speed information acquired from the vehicle speed sensor 13) and steering angle information (steering angle information acquired from the steering angle sensor 14) that are acquired from the vehicle along with movement of the vehicle. A parking range can be identified by using a known parking range identification method.

The display control unit 106 causes the display 12 to display a parking range image indicating the current parking range identified by the parking range identification unit 105 in such a manner that the parking range image is superimposed on the vehicle-surroundings image generated by the vehicle-surroundings image generation unit 103.

When no vehicle speed information can be acquired from the vehicle speed sensor 13 in a process of a gradual reduction in vehicle speed, the estimated movement range calculation unit 107 calculates an estimated movement range of the vehicle after a time when no vehicle speed information can be acquired (an estimated movement range in which the vehicle is presumed to move until the vehicle speed reaches zero) on the basis of deceleration of the vehicle based on vehicle speed information acquired from the vehicle speed sensor 13 before the time when no vehicle speed information can be acquired, and steering angle information acquired from the steering angle sensor 14. A method of calculating an estimated movement range of the vehicle will be described in detail later with reference to FIGS. 3 to 5.

The estimated movement range display unit 108 displays, around the parking range image, an image indicating the estimated movement range calculated by the estimated movement range calculation unit 107 (hereinafter, referred to as "estimated movement range image"). In particular, in the embodiment, the estimated movement range display unit 108 displays, around the parking range image, the estimated movement range image in gradations of color. Specifically, the estimated movement range display unit 108 displays the estimated movement range image in gradations of color in such a manner that color gradually fades with increasing distance from the parking range image.

Figure 2:
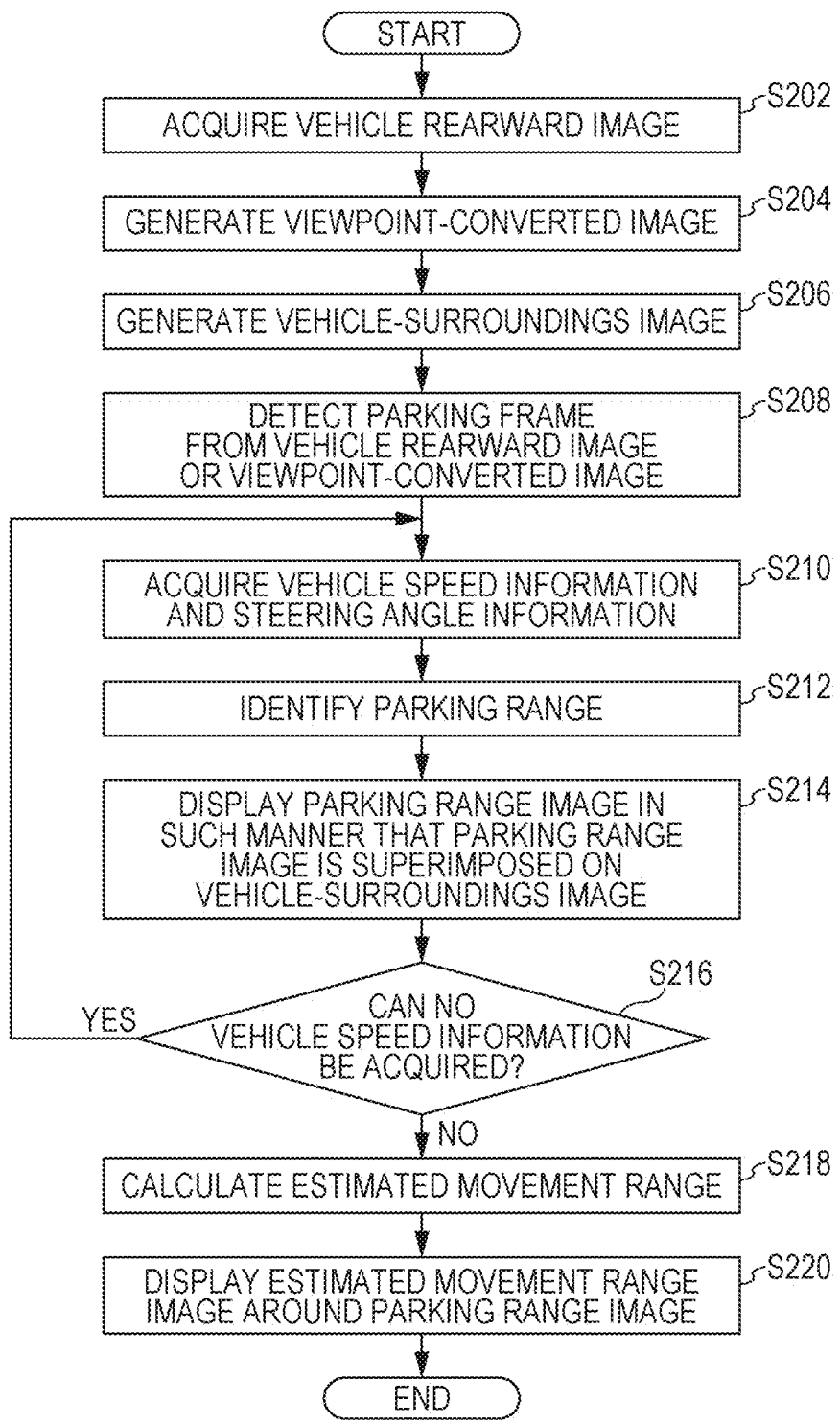
FIG. 2 is a flowchart illustrating an example of a process performed by the parking assist apparatus according to the embodiment of the present disclosure.

FIG. 2 is a flowchart illustrating an example of a process performed by the parking assist apparatus 100 according to the embodiment of the present disclosure. The process illustrated in FIG. 2 is performed at a point in time when a vehicle-surroundings image appears on the display 12 (for example, a point in time when a reverse gear sensor of the vehicle detects a shift to a reverse gear).

First, the image acquisition unit 101 acquires a vehicle rearward image captured by the camera 11 (step S202). Then, the viewpoint-converted image generation unit 102 generates a viewpoint-converted image as viewed from a virtual viewpoint above the vehicle (step S204) by subjecting the vehicle rearward image acquired in step S202 to viewpoint conversion. Subsequently, the vehicle-surroundings image generation unit 103 generates a vehicle-surroundings image (step S206) from the viewpoint-converted image generated in step S204 and an image of the vehicle stored in the vehicle image storage unit 110 in advance. The parking frame detection unit 104 detects a parking frame (step S208) from the vehicle rearward image acquired in step S202 or the viewpoint-converted image generated in step S204.

Then, the parking range identification unit 105 acquires vehicle speed information and steering angle information acquired from the vehicle along with movement of the vehicle (step S210). Subsequently, the parking range identification unit 105 identifies a current parking range (step S212) on the basis of the parking frame detected in step S208, and the vehicle speed information and the steering angle information acquired in step S210. Then, the display control unit 106 causes the display 12 to display a parking range image indicating the current parking range identified in step S212 (step S214) in such a manner that the parking range image is superimposed on the vehicle-surroundings image generated in step S206.

Subsequently, the estimated movement range calculation unit 107 determines whether no vehicle speed information can be acquired from the vehicle speed sensor 13 (step S216). Here, when the estimated movement range calculation unit 107 determines that vehicle speed information can be acquired from the vehicle speed sensor 13 (YES in step S216), the parking assist apparatus 100 performs the operations of step S210 and the subsequent steps again.

On the other hand, when the estimated movement range calculation unit 107 determines that no vehicle speed information can be acquired from the vehicle speed sensor 13 (NO in step S216), the estimated movement range calculation unit 107 calculates an estimated movement range of the vehicle after a time when no vehicle speed information can be acquired (step S218) on the basis of deceleration of the vehicle based on vehicle speed information acquired from the vehicle speed sensor 13 before the time when no vehicle speed information can be acquired, and the steering angle information acquired from the steering angle sensor 14.

Then, the estimated movement range display unit 108 displays, around the parking range image displayed on the display 12, an estimated movement range image indicating the estimated movement range calculated in step S218 (step S220). Then, the parking assist apparatus 100 ends a series of operations illustrated in FIG. 2.

Figure 3:
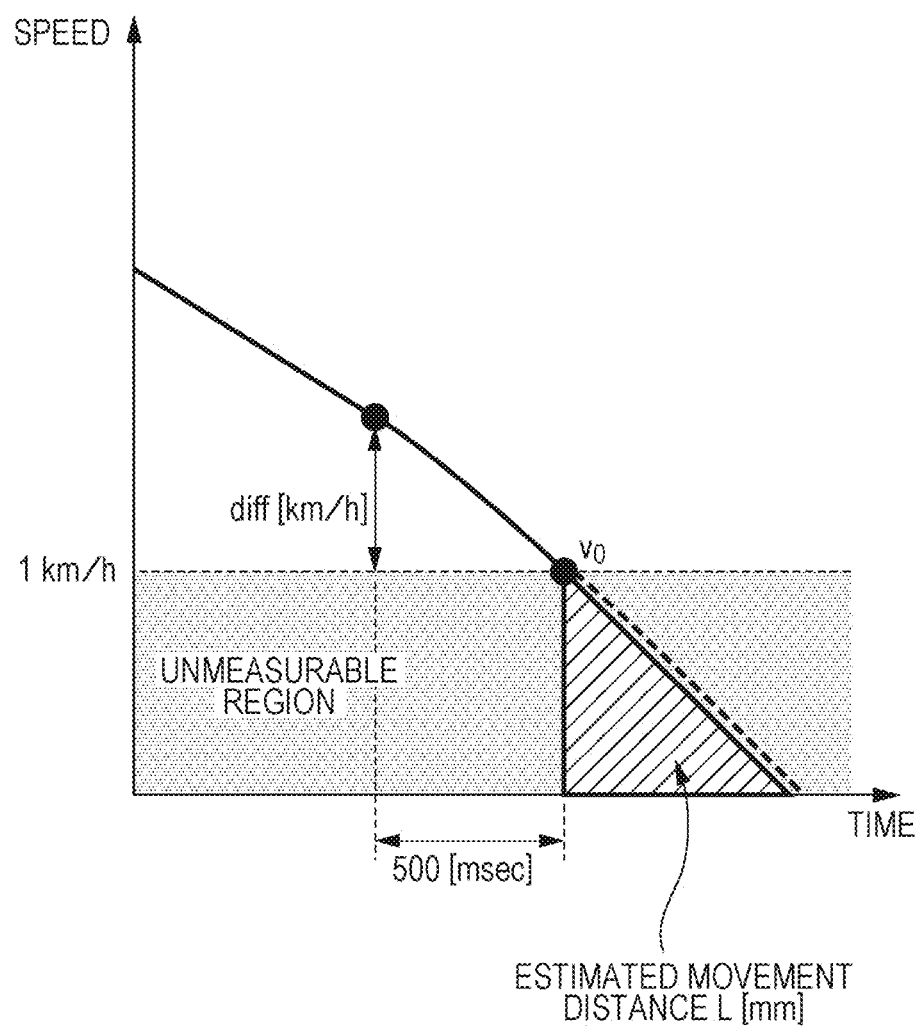
FIG. 3 illustrates an example of a calculation of an estimated movement range performed by an estimated movement range calculation unit.
Figure 4:
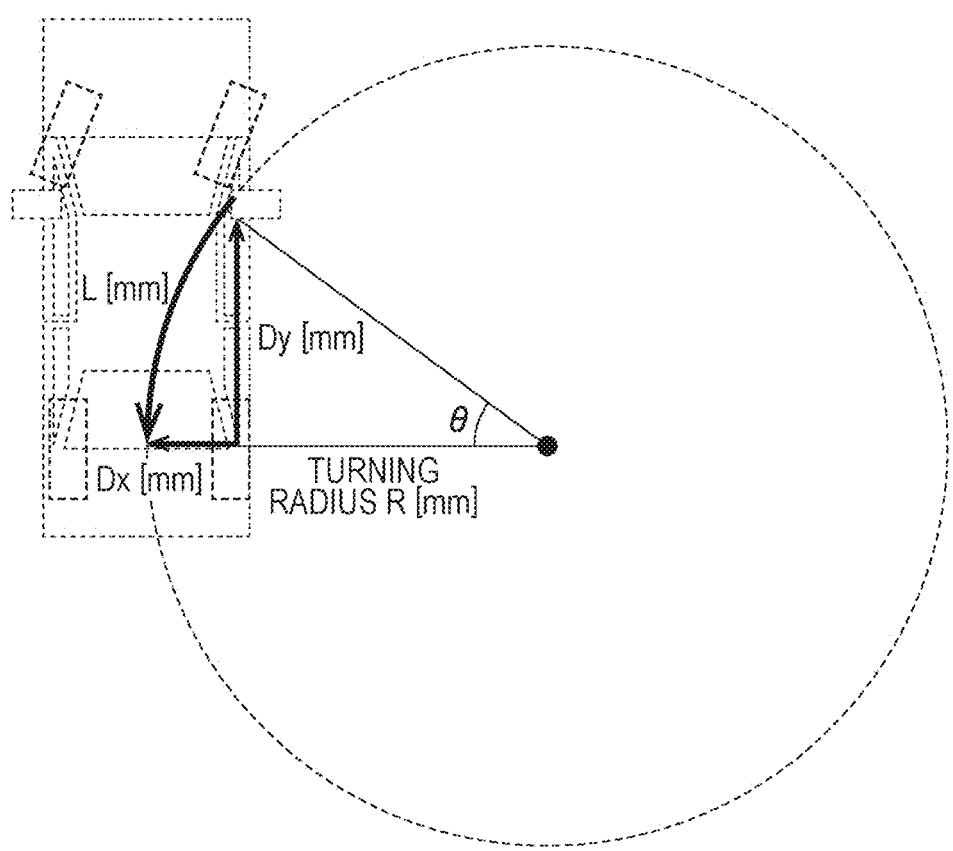
FIG. 4 illustrates an example of a calculation of the estimated movement range performed by the estimated movement range calculation unit.
Figure 5:
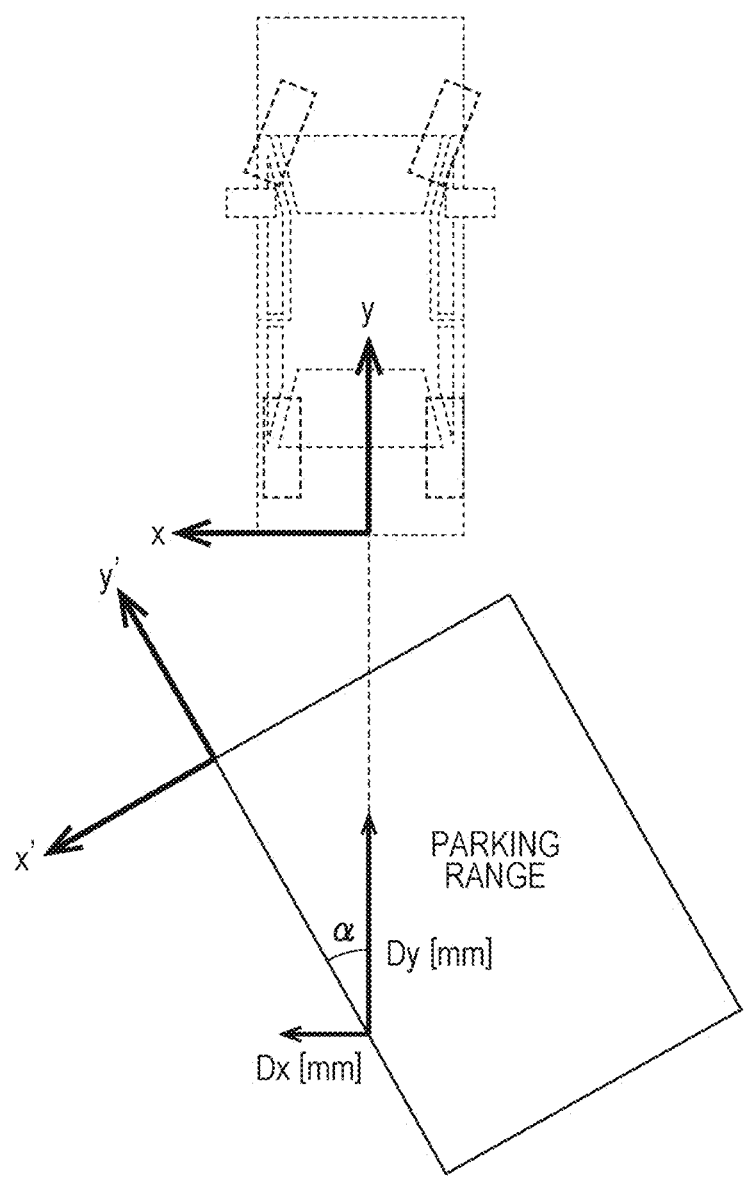
FIG. 5 illustrates an example of a calculation of the estimated movement range performed by the estimated movement range calculation unit.

FIGS. 3 to 5 illustrate an example of a calculation of an estimated movement range performed by the estimated movement range calculation unit 107.

At the outset, as a conceptual diagram is illustrated in FIG. 3, the estimated movement range calculation unit 107 calculates an estimated movement distance L mm of the vehicle. First, acceleration a m/s² is obtained using Expression (1).

$$a\ [m/s^2] = -2 \cdot \textit{diff}(1000/3600)$$
$$= -5/9\textit{diff}\,[m/s^2],$$

Expression (1)

where diff refers to a speed difference between a vehicle speed of 1 km/h and a vehicle speed 500 milliseconds ago.

Then, a speed of v0 m per second at a speed of 1 km/h is obtained using Expression (2).

$$v0 = 1\ [km/h]$$
$$= 1000/3600$$
$$= 5/18\ [m/s]$$

Expression (2)

Then, use of Expression (3) yields an estimated movement distance L mm by which the vehicle is presumed to move until the vehicle gradually decelerates at the acceleration a m/s² obtained using Expression (1) to reach zero speed after the vehicle speed reaches a speed of less than 1 km/h (a speed of v0 m per second).

$$L[mm] = ((v2 - v0^2/2a) \cdot 1000$$
$$= ((02 - (5/18)2)/2) \cdot (-9/5\ \textit{diff}) \cdot 1000$$
$$= 5000/72\ \textit{diff}\,[mm]$$

Expression (3)

Next, as a conceptual diagram is illustrated in FIG. 4, the estimated movement range calculation unit 107 calculates, by using Expression (4), a turning angle θ rad in accordance with the estimated movement distance L mm obtained using Expression (3) and a turning radius R mm corresponding to the steering angle of a front wheel of the vehicle.

$$\theta\ [rad]=L/R$$

Expression (4)

Then, an estimated movement distance Dy mm in a y-direction (longitudinal direction) of the vehicle is calculated using Expression (5).

$$Dy\ [mm]=R \sin \theta$$

Expression (5)

Furthermore, an estimated movement distance Dx mm in an x-direction (lateral direction) of the vehicle is calculated using Expression (6).

$$Dx[mm] = R - R\cos\theta$$
$$= R(1 - \cos\theta)$$

Expression (6)

Next, as a conceptual diagram is illustrated in FIG. 5, the estimated movement range calculation unit 107 calculates, by using Expression (7), an estimated movement distance Dy' mm in a y' direction (longitudinal direction) of a parking range (parking range identified by the parking range identification unit 105) relative to movement of the vehicle on the basis of the estimated movement distance Dy mm in the y-direction (longitudinal direction) of the vehicle obtained using Expression (5) and the estimated movement distance Dx mm in the x-direction (lateral direction) of the vehicle obtained using Expression (6). Furthermore, the estimated movement range calculation unit 107 calculates, by using Expression (8), an estimated movement distance Dx' mm in an x' direction (lateral direction) of the parking range (parking range identified by the parking range identification unit 105).

$$Dy'\ [mm]=Dy \cos \alpha + Dx \sin \alpha,\ \text{and}$$

Expression (7)

$$Dx'\ [mm]=Dy \sin \alpha + Dx \cos \alpha,$$

Expression (8)

where α refers to an angle formed by a y-axis that is the longitudinal direction of the vehicle and a y'-axis that is the longitudinal direction of the parking range.

The estimated movement range display unit 108 causes the estimated movement distances Dx' and Dy' calculated in this way to serve as an estimated movement range, generates an estimated movement range image indicating the estimated movement range, and displays the generated estimated movement range image around a parking range image.

FIGS. 6A to 6C each illustrate an example of a vehicle-surroundings image and an estimated movement range image according to the embodiment of the present disclosure. Vehicle-surroundings images 600a to 600c illustrated in FIGS. 6A to 6C are each an image generated from a viewpoint-converted image 620 obtained by subjecting a vehicle rearward image captured by the camera 11 to viewpoint conversion and an image 610 of a driver's vehicle stored in the vehicle image storage unit 110 in advance. In the viewpoint-converted image 620, there appears a parking frame composed of a white line 621 rearward of the vehicle, a white line 622 on the left side of the vehicle, and a white line 623 on the right side of the vehicle.

In the vehicle-surroundings images 600a to 600c, a parking range image 630 is displayed around the image 610 of the driver's vehicle. The parking range image 630 is an image indicating a current parking range identified on the basis of the position of the parking frame detected from a past vehicle rearward image or a past viewpoint-converted image 620, and vehicle speed information and steering angle information acquired from the vehicle along with movement of the vehicle. In this example, the parking range image 630 is filled in with black as if the parking range is hollowed out.

A driver checks, in each of the vehicle-surroundings images 600a to 600c, a positional relationship between the image 610 of the driver's vehicle, the parking frame appearing in the viewpoint-converted image 620, and the parking range image 630 and thus can check whether the vehicle has been properly parked within the parking frame.

Here, in the vehicle-surroundings image 600b, an estimated movement range image 640 appears only on the front side of the parking range image 630. This is because no vehicle speed information can be acquired from the vehicle speed sensor 13 since the vehicle speed has reached a speed of less than 1 km/h, and because the steering angle of the vehicle is 0 degrees at this time. In the estimated movement range image 640, a longitudinal length of a portion extending forward from the parking range image 630 corresponds to the estimated movement distance Dy' mm calculated by the estimated movement range calculation unit 107. The estimated movement range image 640 is displayed in gradations of color (although, for convenience of explanation, the estimated movement range image 640 is shaded with diagonal lines in FIG. 6B, the estimated movement range image 640 is displayed in gradations of color in fact), thereby enabling the driver to identify an estimated movement range with ease. Specifically, the estimated movement range image 640 is displayed in gradations of color in such a manner that color (the same color as black of the parking range image 630) gradually fades with increasing distance from the parking range image 630. This enables the driver to intuitively grasp the fact that a possibility of occurrence of an error is lowered with increasing distance of the parking range image 630.

In the vehicle-surroundings image 600c, an estimated movement range image 640' appears on the front and right sides of the parking range image 630. This is because no vehicle speed information can be acquired from the vehicle speed sensor 13 since the vehicle speed has reached a speed of less than 1 km/h, and because the steering angle of the vehicle is not less than 1 degree leftward at this time. In the estimated movement range image 640', a longitudinal length of a portion extending forward from the parking range image 630 corresponds to the estimated movement distance Dy' mm calculated by the estimated movement range calculation unit 107. Furthermore, a lateral width of a portion extending rightward from the parking range image 630 corresponds to the estimated movement distance Dx' mm calculated by the estimated movement range calculation unit 107. Like the estimated movement range image 640 of the vehicle-surroundings image 600b, the estimated movement range image 640' is displayed in gradations of color, thereby enabling the driver to identify an estimated movement range with ease.

In the vehicle-surroundings image 600a, no estimated movement range image is displayed. This is because vehicle speed information can be acquired from the vehicle speed sensor 13 (that is, an accurate parking range is indicated by the parking range image 630) since the vehicle speed is not less than 1 km/h.

As described above, according to the embodiment of the present disclosure, if the vehicle speed is reduced to a speed of less than a predetermined speed and thus no vehicle speed information can be acquired from the vehicle speed sensor 13, a user can intuitively grasp an estimated movement range of a vehicle by using an estimated movement range image displayed around a parking range image. Thus, the embodiment of the present disclosure enables, if there is a possibility of occurrence of an error in the position of a pseudo-parking frame, the user to move the vehicle on the basis of the possibility of the error.

In the above-described embodiment, although a parking range image is displayed with it being filled in with black and an estimated movement range image is displayed in gradations of color, the present disclosure is not limited to these display forms. For example, as illustrated in FIGS. 7A and 7B, display forms of a parking range image and an estimated movement range image may be changed.

FIGS. 7A and 7B each illustrate a modification of a parking range image and an estimated movement range image according to the embodiment of the present disclosure. Like the vehicle-surroundings images 600a to 600c illustrated in FIGS. 6A to 6C, vehicle-surroundings images 600d and 600e illustrated in FIGS. 7A and 7B are each an image generated from the viewpoint-converted image 620 obtained by subjecting a vehicle rearward image captured by the camera 11 to viewpoint conversion and the image 610 of the driver's vehicle stored in the vehicle image storage unit 110 in advance.

In the vehicle-surroundings image 600d illustrated in FIG. 7A, a parking range image 730 is composed of a white line surrounding a parking range. Also, an estimated movement range image 740 is composed of a white line surrounding an estimated movement range. That is, in the vehicle-surroundings image 600d, a distance between a front frame line of the parking range image 730 and a front frame line of the estimated movement range image 740 indicates the estimated movement distance Dy' mm. Also, a distance between a right frame line of the parking range image 730 and a right frame line of the estimated movement range image 740 indicates the estimated movement distance Dx' mm.

In the vehicle-surroundings image 600e illustrated in FIG. 7B, a parking range image 730' is a portion surrounded by a white frame line indicating an estimated movement range image 740'. The estimated movement range image 740' is an image of an estimated movement range filled in with a white frame. That is, in the vehicle-surroundings image 600e, a longitudinal length of a white frame portion extending forward from the parking range image 730' indicates the estimated movement distance Dy' mm. Also, a lateral width of a white frame portion extending rightward from the parking range image 730' indicates the estimated movement distance Dx' mm.

Although, in the above-described embodiment, a vehicle rearward image is used as an example of a vehicle capture image to describe an example of assistance of reverse parking of a vehicle, the present disclosure is not limited to this. For example, as a vehicle capture image, a vehicle forward image captured by a front camera that captures an image of an area forward of the vehicle may be used to assist forward parking of the vehicle.

In addition, any embodiment described above is merely an example of an embodiment for implementing the present disclosure, and the technical scope of the present disclosure is not to be construed in a limited manner due to the above embodiment. That is, the present disclosure may be implemented in various forms without departing from the gist thereof or a principal feature thereof.

The invention claimed is:

1. A parking assist apparatus that assists parking of a vehicle, the parking assist apparatus comprising:
   an image acquisition unit configured to acquire a vehicle capture image captured by a camera mounted on the vehicle;
   a viewpoint-converted image generation unit configured to generate a viewpoint-converted image, as viewed from a virtual viewpoint above the vehicle, by subjecting the vehicle capture image acquired by the image acquisition unit to viewpoint conversion;

a vehicle-surroundings image generation unit configured to generate a vehicle-surroundings image of surroundings of the vehicle, as viewed from an upper virtual viewpoint, from the viewpoint-converted image generated by the viewpoint-converted image generation unit, and an image of the vehicle stored in a storage unit in advance;

a parking range identification unit configured to identify a current parking range by using a parking frame detected from a past vehicle capture image or a past viewpoint-converted image, and vehicle speed information and steering angle information acquired from a sensor on the vehicle during movement of the vehicle;

a display control unit configured to cause an image indicating the current parking range identified by the parking range identification unit to be displayed in such a manner as to be superimposed on the vehicle-surroundings image;

an estimated movement range calculation unit configured to calculate, when no vehicle speed information can be acquired in a process of a gradual reduction in speed of the vehicle, an estimated movement range of the vehicle after a time when no vehicle speed information can be acquired, by using deceleration of the vehicle based on vehicle speed information acquired before the time when no vehicle speed information can be acquired, and the steering angle information; and an estimated movement range display unit configured to display, around the image indicating the current parking range, an image indicating the estimated movement range calculated by the estimated movement range calculation unit.

2. The parking assist apparatus according to claim 1, wherein the estimated movement range display unit displays, around the image indicating the current parking range, the image indicating the estimated movement range in gradations of color in such a manner that color gradually fades with increasing distance from the image indicating the current parking range.

3. A parking assist method performed by a parking assist apparatus that assists parking of a vehicle, the parking assist method comprising:

an image acquisition step of acquiring, with an image acquisition unit of the parking assist apparatus, a vehicle capture image captured by a camera mounted on the vehicle;

a viewpoint-converted image generation step of generating, with a viewpoint-converted image generation unit of the parking assist apparatus, a viewpoint-converted image, as viewed from a virtual viewpoint above the vehicle, by subjecting the vehicle capture image acquired by the image acquisition unit to viewpoint conversion;

a vehicle-surroundings image generation step of generating, with a vehicle-surroundings image generation unit of the parking assist apparatus, a vehicle-surroundings image of surroundings of the vehicle, as viewed from an upper virtual viewpoint, from the viewpoint-converted image generated by the viewpoint-converted image generation unit and an image of the vehicle stored in a storage unit in advance;

a parking range identification step of identifying, with a parking range identification unit of the parking assist apparatus, a current parking range by using a parking frame detected from a past vehicle capture image or a past viewpoint-converted image, and vehicle speed information and steering angle information acquired from a sensor on the vehicle during movement of the vehicle;

a display control step of causing, with a display control unit of the parking assist apparatus, an image indicating the current parking range identified by the parking range identification unit to be displayed in such a manner as to be superimposed on the vehicle-surroundings image;

an estimated movement range calculation step of calculating, with an estimated movement range calculation unit of the parking assist apparatus, when no vehicle speed information can be acquired in a process of a gradual reduction in speed of the vehicle, an estimated movement range of the vehicle after a time when no vehicle speed information can be acquired, by using deceleration of the vehicle based on vehicle speed information acquired before the time when no vehicle speed information can be acquired, and the steering angle information; and an estimated movement range display step of displaying, with an estimated movement range display unit of the parking assist apparatus, around the image indicating the current parking range, an image indicating the estimated movement range calculated by the estimated movement range calculation unit.

* * * * *